US012045205B2

(12) United States Patent
Steinke

(10) Patent No.: US 12,045,205 B2
(45) Date of Patent: Jul. 23, 2024

(54) IDENTIFYING A CURRENT JOURNAL STATE BY INVALIDATING RECORDS BASED ON OUT OF ORDER WRITES

(71) Applicant: Dell Products L.P., Round Rock, TX (US)

(72) Inventor: Ron Steinke, Tacoma, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 310 days.

(21) Appl. No.: 17/587,333

(22) Filed: Jan. 28, 2022

(65) Prior Publication Data

US 2023/0273903 A1   Aug. 31, 2023

(51) Int. Cl.
  *G06F 16/18* (2019.01)
  *G06F 11/10* (2006.01)
  *G06F 16/17* (2019.01)
  *G06F 16/182* (2019.01)

(52) U.S. Cl.
  CPC ...... *G06F 16/1815* (2019.01); *G06F 11/1004* (2013.01); *G06F 16/1734* (2019.01); *G06F 16/1824* (2019.01); *G06F 16/1865* (2019.01)

(58) Field of Classification Search
  CPC ...... G06F 16/18; G06F 16/1815; G06F 16/17; G06F 16/1824; G06F 16/182; G06F 16/1865; G06F 16/1734; G06F 11/1004

USPC ........................................................ 707/609
See application file for complete search history.

(56) References Cited

U.S. PATENT DOCUMENTS

| | | | |
|---|---|---|---|
| 6,185,552 B1* | 2/2001 | DeLong | G06F 16/90348 |
| 10,602,315 B2* | 3/2020 | Vijayvergiya | G06F 16/27 |
| 2013/0311422 A1* | 11/2013 | Walker | G06F 16/217 |
| | | | 707/609 |
| 2017/0185350 A1* | 6/2017 | Waidhofer | G06F 3/0679 |
| 2018/0336125 A1* | 11/2018 | Battaje | G06F 12/0246 |
| 2020/0201826 A1* | 6/2020 | Raju | G06F 16/1774 |

* cited by examiner

*Primary Examiner* — Shahid A Alam
(74) *Attorney, Agent, or Firm* — Amin, Turocy & Watson, LLP

(57) ABSTRACT

The technologies described herein are generally directed toward identifying a current journal state by determining the most recent valid journal record using valid and null journal records. According to an embodiment, a system can comprise a processor and a memory that can enable performance of operations including identifying a hint journal record of a group of journal records of a journal of a journaled data storage system. The operations can further include, based on an identified null record and the hint journal record, determining a highest sequence journal record comprising a sequence indicator. The operations can further include, based on the sequence indicator, analyzing, by the journaling equipment, other journal records of the group of journal records to confirm that the highest sequence journal record corresponds to a valid journal state.

20 Claims, 10 Drawing Sheets

400

```
                                    ┌─ 450
struct jl_record_tail {
    uint32_t               jlr_magic;
    uint32_t               jlr_version;
    /* first 512 byte sector in record */
    jsect_t                jlr_start;
    /* record sequence, used to find the journal end after wraparound */
    uint64_t               jlr_seq;                              ──── 430
    /* 512 byte block count, excluding this block */
    uint16_t               jlr_n512 : 10;
    /* 8k block count */
    uint16_t               jlr_n8k: 6;
    uint64_t               jlr_pad : (JL_PAD_BYTES * NBBY);
    /* number of records currently in the journal, excluding this one */
    uint32_t               jlr_nactive;                          ──── 420
    /* number of in-flight record writes when this record was written */
    uint32_t               jlr_ninflight;
    struct jl_small_record jlr_small_records[JL_NUM_SMALL_RECORDS];
    uint8_t                jlr_idict[JL_RECORD_BLOCKS];
    uint32_t               jlr_crcs[JL_RECORD_BLOCKS];
};
          410 ─┘
```

FIG. 4

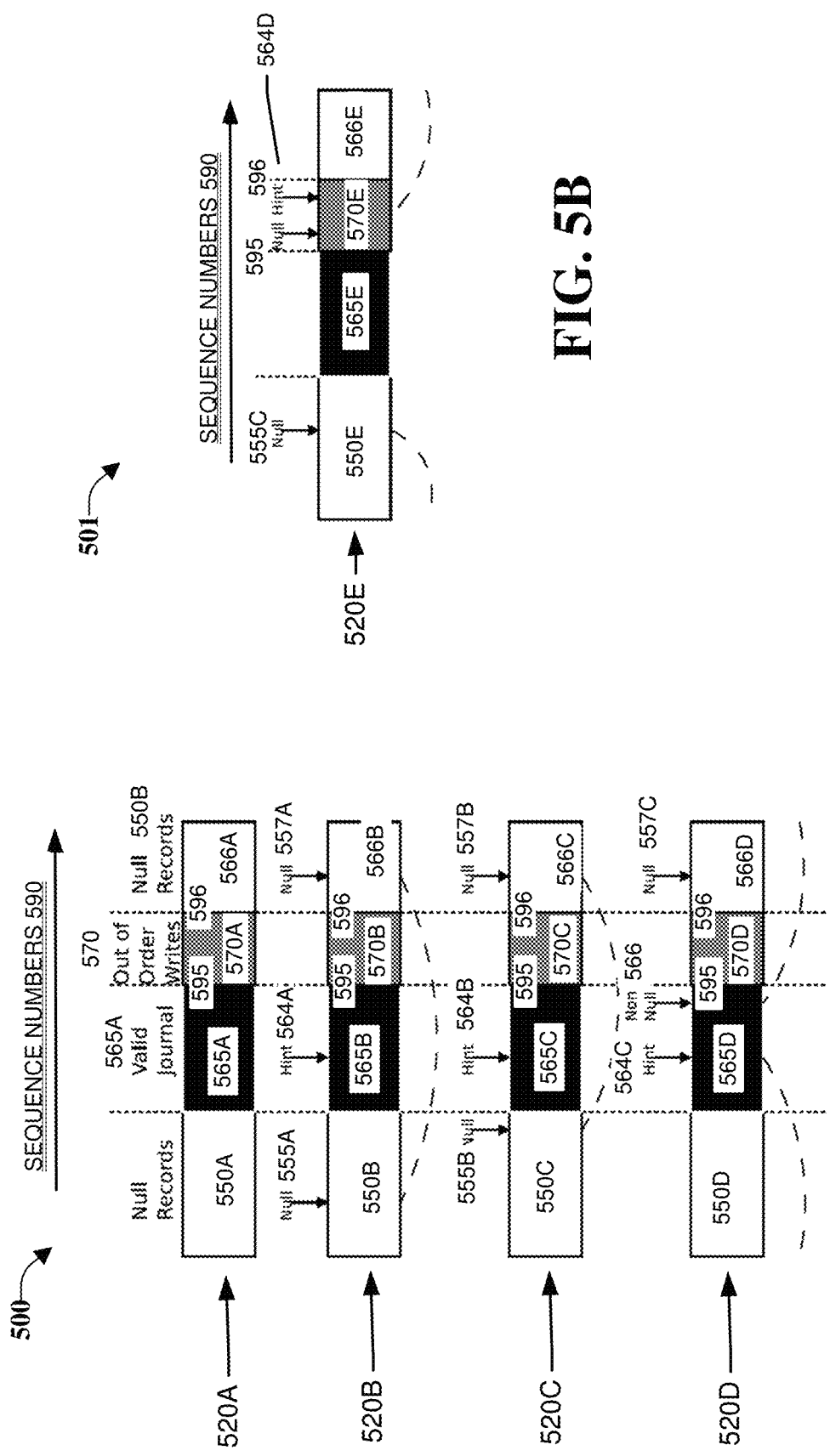

IDENTIFYING A CURRENT JOURNAL STATE BY INVALIDATING RECORDS BASED ON OUT OF ORDER WRITES

BACKGROUND

Modern data storage computer systems can facilitate the storage and manipulation of data by a variety of different network equipment. Many different approaches are used to protect stored and new data from loss. One approach used by data storage systems to protect changes to stored data uses a separate log of changes that can be used to replay changes if needed, e.g., a journal. Journals can be maintained with different storage technologies, each with a different mix of characteristics that include, but are not limited to, storage and access speeds, durability, capacity to store data, cost, and hardware requirements.

Problems can occur when logical approaches to one type of storage technology are used with different types of storage technologies, e.g., using approaches developed for magnetic media with other storage technologies.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

A non-limiting example system can operate as follows. The system can include a processor and a memory that stores executable instructions that, when executed by the processor, facilitate performance of operations. The instructions can include an instruction to identify a hint journal record of a group of journal records of a journal of a journaled data storage system. The operations can further include an instruction to, based on an identified null record and the hint journal record, determine a highest sequence journal record comprising a sequence indicator. The operations can further include an instruction to, based on the sequence indicator, analyze, by the journaling equipment, other journal records of the group of journal records to confirm that the highest sequence journal record corresponds to a valid journal state.

A non-limiting example method can comprise identifying a hint journal record of a group of journal records of a journal of a journaled data storage system. The method can further comprise, based on an identified null record and the hint journal record, determining, by the journaling equipment, a highest sequence journal record comprising a sequence indicator. Further, the method can comprise, based on the sequence indicator, analyze, by the journaling equipment, other journal records of the group of journal records to confirm that the highest sequence journal record corresponds to a valid journal state.

A non-limiting example non-transitory computer-readable medium can comprise instructions that, in response to execution, cause a system comprising a processor to perform operations. These operations can include instructions for identifying a hint journal record of a group of journal records of a journal of a journaled data storage system. The instructions can further enable, based on an identified null record and the hint journal record, determining, by the journaling equipment, a highest sequence journal record comprising a sequence indicating value. Further, the instructions can comprise, based on the sequence indicating value, analyzing, by the journaling equipment, other journal records of the group of journal records to confirm that the highest sequence journal record corresponds to a current valid journal state.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 is an architecture diagram of an example journal record tail block that can facilitate identifying a current journal state by providing metadata about linkages between journal records, in accordance with one or more embodiments.

FIG. 5A depicts a diagram that illustrates a non-limiting example of how one or more embodiments can facilitate identifying a current journal state by determining the most recent valid journal record using valid and null journal records, in accordance with one or more embodiments.

FIG. 5B depicts a diagram that illustrates a non-limiting example of how one or more embodiments can facilitate identifying a current journal state by determining the most recent valid journal record using valid and null journal records, in accordance with one or more embodiments.

DETAILED DESCRIPTION

Generally speaking, one or more embodiments described herein can facilitate identifying a current journal state by determining the most recent valid journal record using valid and null journal records. As described by some examples herein, one or more embodiments can find the most recently written contiguous journal record of a group of journal records. That is, embodiments can find journal records written after ignoring a gap in sequential records based on out of order writes. In an example approach discussed with other approaches herein, one or more embodiments can find the most recently contiguous written record (or any record with a higher sequence), by recording the number of current in-flight record writes in every record as the records are written, e.g., out-of-order writes can be ignored for binary searching because once a journal record with an out-of-order write is identified with a sequence higher than the current end-of-journal sequence number, the most recently written contiguous journal record has been discovered, and the search has succeeded.

Elements of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As will be understood, the implementation(s) described herein are non-limiting examples, and variations to the technology can be implemented. For instance, even though many of the examples described herein are implemented in journaled data storage systems, approaches described herein can be beneficially used in other similar contexts without departing from the descriptions and suggestions described herein. As such, any of the embodiments, concepts, structures, functionalities, implementations and/or examples described herein are non-limiting, and the technology may be used in various ways that provide benefits and advantages in data manipulation systems technology in general, both for existing storage technologies and technologies in this area that are yet to be developed.

Figure 1:
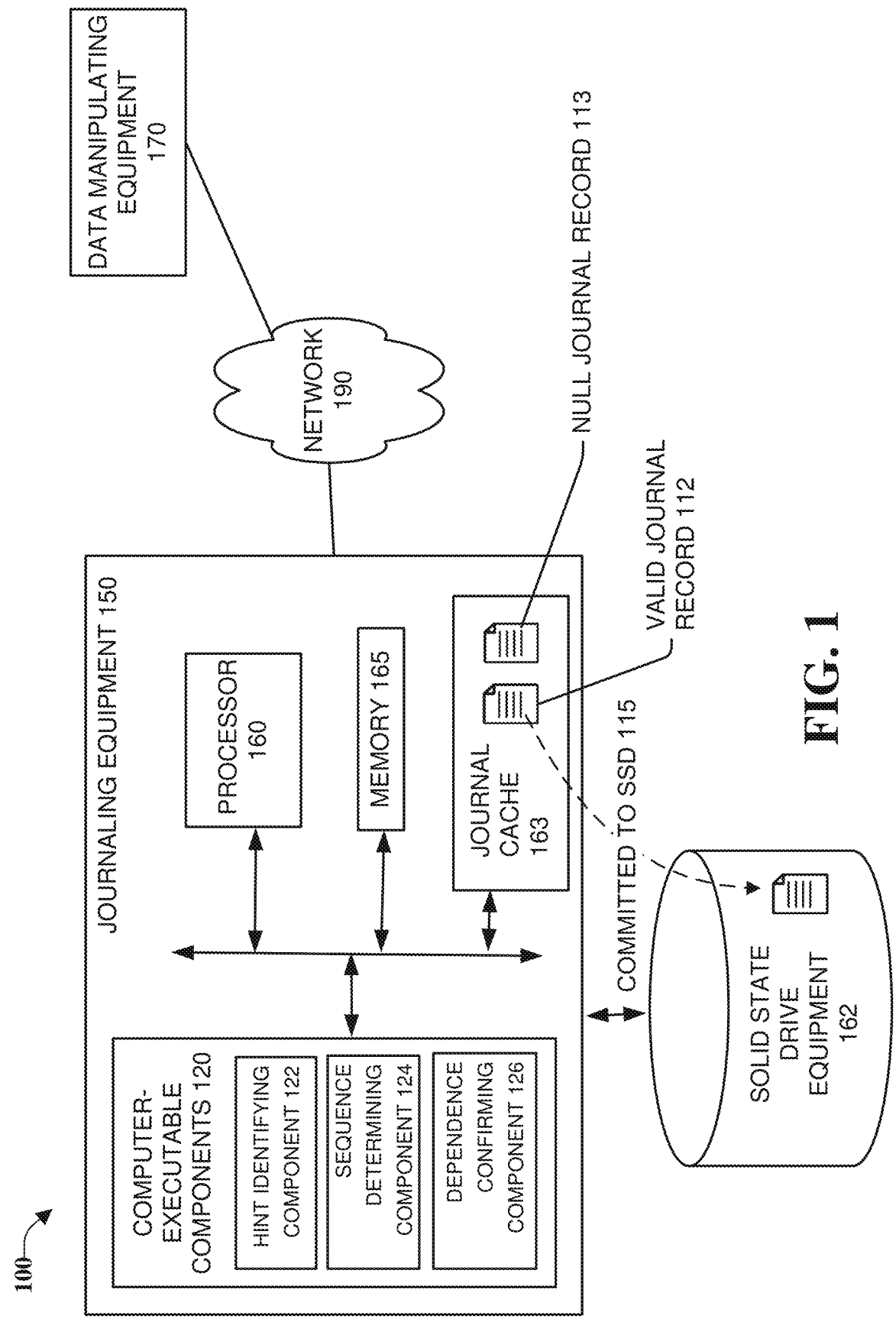
FIG. 1 is an architecture diagram of a non-limiting example system that can facilitate identifying a current journal state by determining the most recent valid journal record using valid and null journal records, in accordance with one or more embodiments.

FIG. 1 is an architecture diagram of a non-limiting example system 100 that can facilitate identifying a current journal state by determining the most recent valid journal record using valid and null journal records, in accordance with one or more embodiments. For purposes of brevity, description of like elements and/or processes employed in other embodiments is omitted. As depicted, system 100 includes journaling equipment 150 connected to solid state drive equipment 162, and data manipulating equipment 170 via network 190. According to multiple embodiments, journaling equipment 150 can include memory 165 that can store one or more computer and/or machine readable, writable, and/or executable components 120 and/or instructions. As discussed further below, journal cache 163 broadly represents an approach to storing journal records while being manipulated, e.g., before being stored in a storage environment with different characteristics, such as SSD 162. For illustrative purposes, journal cache 163 includes valid journal record 113 and null journal record 113.

With reference to SSD 162, one or more embodiments can provide a logical approach to data storage and manipulation that is adapted to take advantage of different characteristics of this and other storage technologies. For example, for some implementations of SSD 162, writing to the semiconductor media of SSD 162 in a linear write pattern (e.g., sequentially) has advantages that are not available in some implementations of magnetic media storage technologies. In another example, for some implementations of SSD 162, undiscovered uncorrectable errors are less likely to occur, as compared to other storage technologies, e.g., magnetic media. As described further below, at least these two characteristics can be utilized to advantage, but one or more embodiments.

In embodiments, journaling equipment 150 can further include processor 160 and journal cache 163. In one or more embodiments, computer-executable components 120, when executed by processor 160, can facilitate performance of operations defined by the executable component(s) and/or instruction(s). Computer executable components 120 can include hint identifying component 122, sequence identifying component 124, dependence confirming component 126, and other components described or suggested by different embodiments described herein, that can improve the operation of system 100. As discussed further below, journal cache 163 can cache journal records before they are stored to SSD equipment 162, e.g., valid journal record 112 and null journal record 113, with the former potentially being flushed to SSD equipment 162 and the latter not being stored to SSD equipment 162.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.)

that can employ one or more memory architectures. Further examples of memory 165 are described below with reference to system memory 1006 and FIG. 10. Such examples of memory 165 can be employed to implement any embodiments of the subject disclosure.

It is understood that the computer processing systems, computer-implemented methods, apparatus, and computer program products described herein employ computer hardware and/or software to solve problems that are highly technical in nature (e.g., analyzing journal records of a journaled data storage system), that are not abstract and cannot be performed as a set of mental acts by a human. For example, a human, or even a plurality of humans, cannot efficiently analyze and maintain the data system journal with a level of accuracy and/or efficiency as the various embodiments described herein.

In one or more embodiments, memory 165 can store computer and/or machine readable, writable, and/or executable components 120 and/or instructions that, when executed by processor 160, can facilitate execution of the various functions described herein relating to hint identifying component 122, sequence identifying component 124, dependence confirming component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In a non-limiting example, memory 165 can store executable instructions that can facilitate generation of hint identifying component 122, which can in some implementations, identify a hint journal record of a group of journal records of a journal of a journaled data storage system. As discussed with FIGS. 3-5 below, one or more embodiments can identify a hint journal record of a group of journal records stored in cache 163, e.g., to provide useful foreknowledge of aspects of the group of journal records. Additional details regarding hint journal records are provided with the discussion of FIGS. 5A-5B below.

In an additional non-limiting example, memory 165 can store executable instructions that can facilitate generation of sequence identifying component 124, which can in some implementations, can, based on an identified null record and the hint journal record, determine, by the journaling equipment, a highest sequence journal record comprising a sequence indicator. As discussed with FIGS. 3-5 below, one or more embodiments can, based on an identified null journal record 113 and the hint journal record (valid journal record 112), determine, by the journaling equipment 150, a highest sequence journal record comprising a sequence indicator.

One having skill in the relevant art(s) understands that, based on the operation of a journaled data system, there can be useful reasons to have a number assigned to journal records that reflect the order in which the records were generated, e.g., changes to data in a journal record with a higher sequence number (e.g., also termed sequence indicator, sequence indication value) occurred more recently in time than journal records with lower sequence number. Given the description herein, one having skill in the relelvant art(s) further understands that some embodiments described herein, at the time they are operating, are designed, not to only find a journal record that reflects any valid journal state, rather, the most recent valid journal record can indicate the valid journal state at the time the embodiments operate, e.g., the current valid journal state. It is understood by one having skill in the relevant art(s), given the description herein, that some embodiments operate on a range of journal records where the latest valid record (e.g., the current valid journal state) is unknown, and that benefits can result from efficiently locating the latest valid journal record.

Returning to a non-limiting example, memory 165 can store executable instructions that can facilitate generation of dependence confirming component 126, which can in some implementations, can, based on the sequence indicator, analyze, by the journaling equipment, other journal records of the group of journal records to confirm that the highest sequence journal record corresponds to a valid journal state.

As discussed with FIGS. 3-5 below, one or more embodiments can, based on the sequence indicator, analyze, by the journaling equipment, other journal records of the group of journal records to confirm that the highest sequence journal record corresponds to a valid journal state. One having skill in the relevant art(s), given the description herein, appreciates that, in some circumstances, the valid journal state can be used for different operations, including but not limited to, rebuilding and replaying the journal during at a mounting phase.

For some embodiments described herein the valid journal state refers to the most recently created valid journal record, e.g., replaying the journal up to this point would produce a state that would not omit any changes to the data. As is appreciated by one having skill in the relevant art(s), given the description herein, when otherwise valid journal record 112 depends from null journal record 113, the state produced by replaying the journal up to the valid journal record 112 could include erroneous data from null journal record 113, and thus, in this example, 'valid' journal record 112 is determined to be invalid because its dependence upon null journal record 113. As described in greater detail below, this example circumstance can be prevented by different implementations of one or more embodiments. One having skill in the relevant art(s), given the discussion herein, appreciates that null journal record can be labeled as null for reasons including, but not limited to, failing a data integrity check (e.g., a checksum), and being identified as dependent upon a null record.

It is appreciated that the embodiments of the subject disclosure depicted in various figures disclosed herein are for illustration only, and as such, the architecture of such embodiments are not limited to the systems, devices, and/or components depicted therein. For example, in some embodiments, journaling equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that journaling equipment 150 can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as journaling equipment 150.

Figure 2:
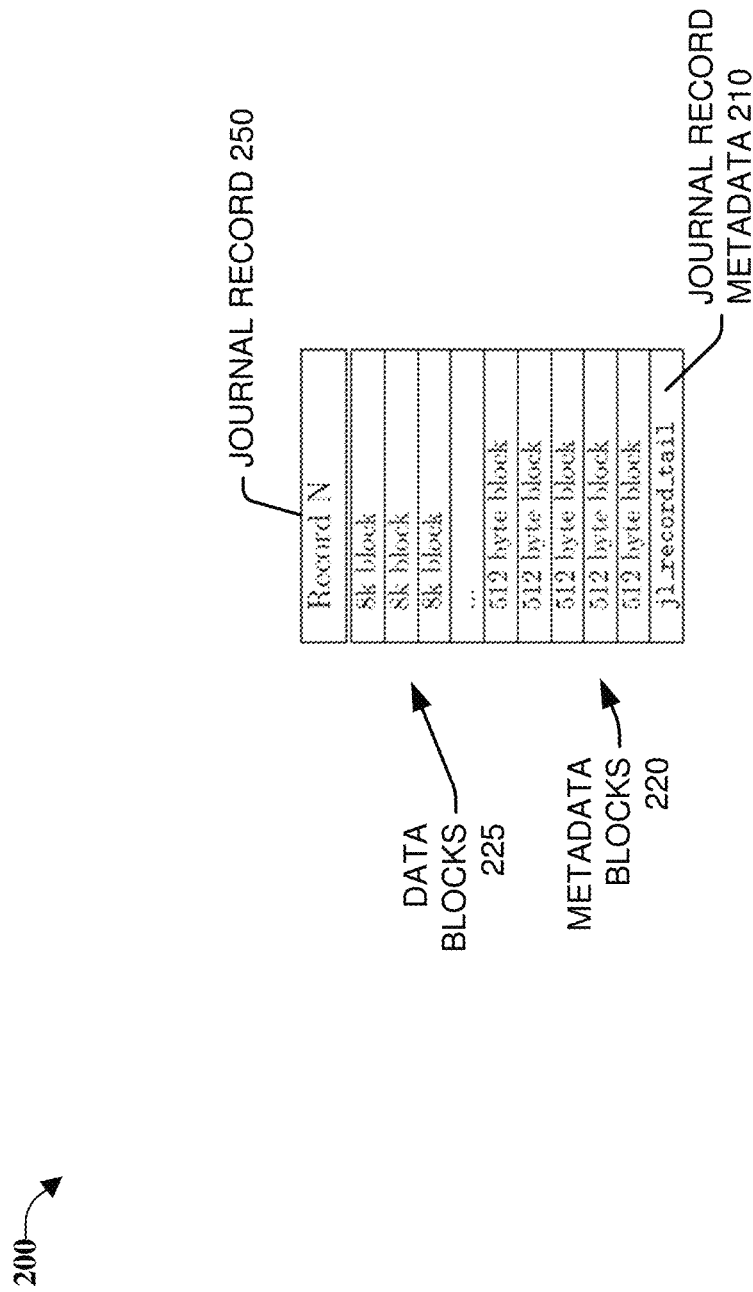
FIG. 2 is a diagram of a non-limiting example data structure that can facilitate storing a journal state with sequenced records and transactions, in accordance with one or more embodiments.

FIG. 2 is a diagram of a non-limiting example data structure 200 that can facilitate storing a journal state with sequenced records and transactions, in accordance with one or more embodiments. For purposes of brevity, description of like elements and/or processes employed in other embodiments is omitted.

As depicted, system 200 includes a non-limiting, example journal record 250 having 8 k data blocks 225 and 512 byte metadata blocks 220, with these example sizes being non-limiting. Journal record 250 further includes journal record metadata 210 discussed in detail with FIGS. 5A-5B and 6 below. One having skill in the relevant art(s), given the description herein, appreciates that the data structures described herein (e.g., FIGS. 2-3) are non-limiting, and that many of the embodiments described herein can also be used with data, stored in a different format, that performs the functions of a journal of a data storage system.

It should be noted that, in one or more embodiments, while data blocks 225 generally store filesystem data, metadata blocks 220 can be a mix of filesystem data (e.g., inodes) and journal metadata. In one or more embodiments, journal record metadata 210 can be a tail attribute for journal record 250, e.g., describing the information stored in, and the configuration of, journal record 250. As noted above, the 8K and 512 bytes non-limiting example sizes for data blocks 225 and metadata blocks 220, respectively, can be changed based on the requirements of different implementations. Because journal record metadata 210 includes metadata attributes that can be used by some implementations of embodiments, an example of this metadata is included in FIG. 4 and this metadata is referenced in the description of FIGS. 5A-5B.

As described in some examples below, a non-limiting example system that can benefit in some circumstances from the use of one or more embodiments of journaling equipment 150, is a system that can facilitate storing data resources among networked computing devices, e.g., data storage arrays. In some implementations, system 100 can be a part of file storage system that implements a data protection system. In different implementations, data protection systems can benefit from the improved data protection and performance that can be facilitated by one or more embodiments, e.g., including, but not limited to, enabling data systems utilize different benefits of SSD equipment 162.

Example data protection systems which can employ one or more of the approaches described with embodiments herein include, but are not limited to EMC ISILON®, an example network attached storage (NAS) platform provided by DELL EMC, Inc. Example storage array devices which can employ one or more of the approaches described with embodiments herein can also include, but are not limited to, POWERMAX enterprise data storage array system provided by DELL EMC, Inc.

Figure 3:
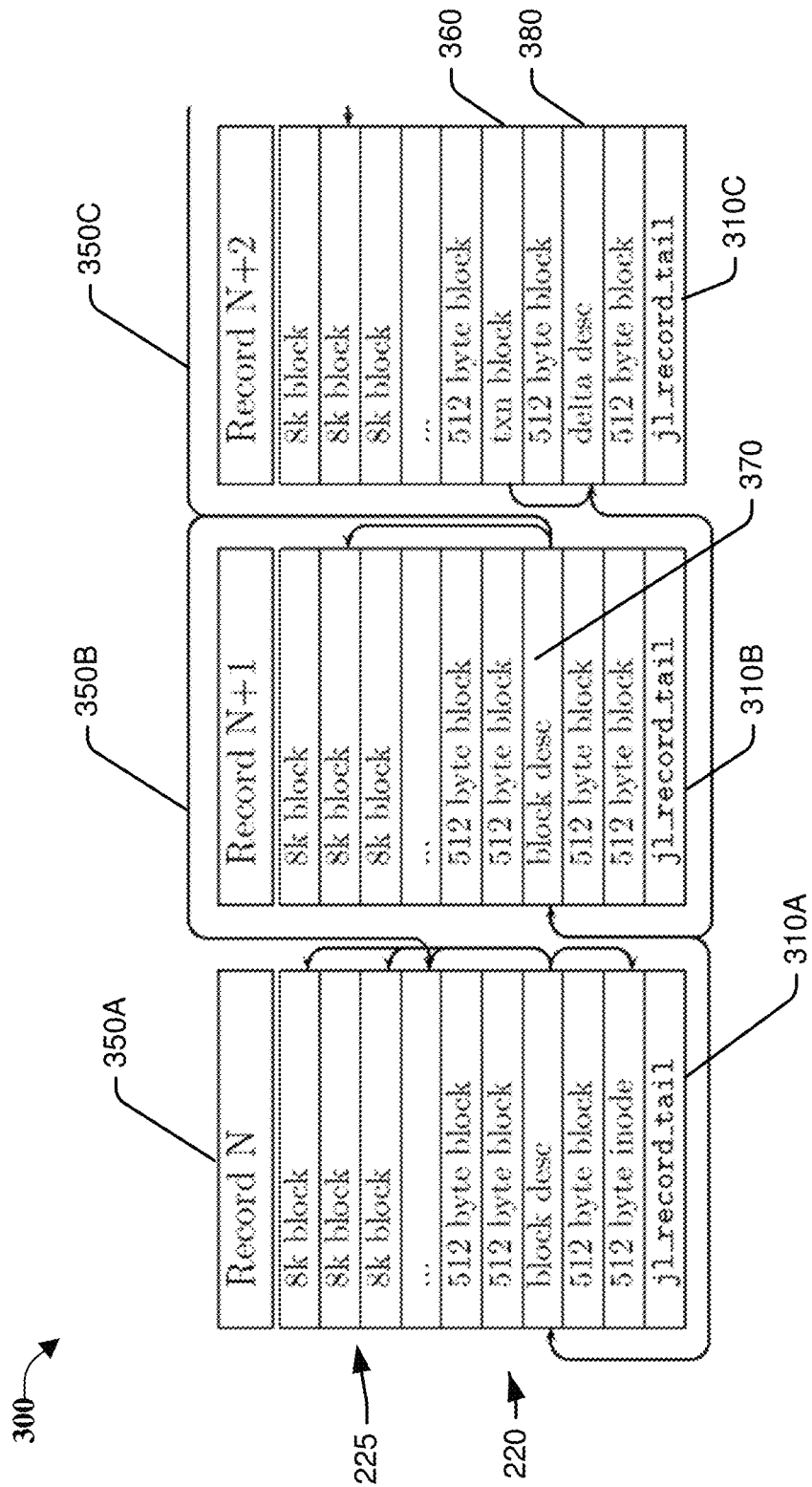
FIG. 3 is a diagram of a non-limiting example data structure that can facilitate storing a journal state with sequenced records and transactions, in accordance with one or more embodiments.

FIG. 3 is a non-limiting example 300 of a linked sequence of journal records that continues the description of the data structure of FIG. 2, in accordance with one or more embodiments. For purposes of brevity, description of like elements and/or processes employed in other embodiments is omitted. As depicted, system 300 includes a non-limiting example group of journal records 350A-C, that together make up a transaction. The example journal records 350A-C have sequence numbers (N, N+1, N+2), and, from FIG. 2, data blocks 225 and metadata blocks 225 labeled in journal record 350A and also present in journal records 350B-C.

In one or more embodiments, although the example journal records 350A-C represent a transaction, there is no strict correspondence between transactions and journal records 350A-C. In this example, a transaction can spans the three journal records 350A-C records, with the blocks of this transaction being intermingled with the blocks of other transactions partially or fully stored in journal records 350A-C and other journal records. In one or more embodiments, this approach can be used to increase concurrency, while still allowing data to be written to the journal as soon as it is received. This transaction structure can also be utilized to facilitate linear storage of data on SSD 162.

In one or more embodiments, the metadata blocks 225 within journal records 350A-C can start at the end of the record and be allocated backwards. In one or more embodiments, this data structure within journal records can facilitate a linear write pattern when the journal records are stored to SSD 162, e.g., because the 512 byte blocks can be sequentially written at once when the journal record is flushed. In some implementations where filesystem data is stored, given the dominance of 8 k blocks for some filesystem data, records where the total space used by 512 byte blocks exceeds 8 k will be unlikely.

FIG. 4 is an architecture diagram of an example journal record tail block 400 that can facilitate identifying a current journal state by providing metadata about linkages between journal records, in accordance with one or more embodiments. For purposes of brevity, description of like elements and/or processes employed in other embodiments is omitted. In this example, tail block 400 corresponds to journal record metadata blocks 310A-C respectively included in journal records 350A-C, and journal record metadata 210 of journal record 250. As depicted, journal record tail block 400 can include a variety of metadata about journal records, including a label for the journal record tail block (jl_record_tail) 450, a sequence number (jlr_seq) 430 for the journal record, an inflight threshold journal records (jlr_ninflight 410, discussed below) 410, and other non-labeled metadata.

Generally speaking, one or more embodiments use different approaches to analyze and classify records into three kinds of records: 1) null records, e.g., where the record metadata block is invalid, 2) records with a valid sequence value (e.g., based interpreting a file type identifier or 'magic' number of the record) but having potential errors, e.g., where the record has a valid metadata block, and a usable sequence number, but may not be part of a valid record due to a partial write. Stated differently, in some circumstances, with these sequenced records, the journal record checksums don't match, but the jl_record_tail 400 is otherwise valid, and the sequence number in the block is assumed to have been written in the course of normal journal writes. Continuing the list of journal record classifications, one or more embodiments can also classify records as: 3) valid records, e.g., the record is complete in the journal, including its metadata block.

In some embodiments, the classification of journal records can be simplified by certain guides: 1) conversion from 'valid' or "sequenced records but potentially unwritten records" to "null" records only happens during journal creation or restore from backup, and 2) there are no 'null' records between a record with a sequence number below that of the most recent journal record, and the most recent journal record. In some circumstances, this second guide is in place because the initial state after journal creation or restore is a contiguous set of "valid" journal records, with the rest of the journal records being "null," e.g., the most recent journal record only advances when a contiguous set of records are written, so this invariant can be preserved by normal journal writes.

For classifying invalid records by one or more embodiments, with the journal records of the group of journal records being stored on logical blocks of data storage equipment, an invalid journal record can be identified as invalid based on the invalid journal record being determined to be comprised of an invalid logical block. For example, in some implementations a journal record is valid if the checksums on the data blocks 225 and aggregated metadata blocks 220 match. In some circumstances, any full data blocks 225 which were unused when the record was written can be ignored for this validation. One having skill in the relevant art(s), given the description herein, appreciates that other approaches can be used to classify records as invalid, without departing from the descriptions herein.

To establish the valid journal state, in one or more embodiments, a valid journal record with the highest jlr_seq 430 value is identified, along with the immediately preceding number (e.g., jlr_nactive 420) of active records. As discussed further with FIGS. 5A and 5B below, the range of journal records that are searched to locate the journal record with the highest jlr_seq 430 value can be limited by a starting point hint provided to one or more embodiments.

If one of preceding number of active records is invalid, and is more than the inflight threshold for journal records (e.g., jlr_ninflight 410) records before the high record, the journal is considered not valid. Alternatively, invalid records closer to the highest jlr_seq 430 value record than jlr_ninflight 410 do not invalidate the journal, as they were never completely written to SSD 162, e.g., were still 'inflight' when writing stopped. In this circumstance, the highest jlr_seq 430 value valid record before the invalid record is treated as the high record of the journal, and the jlr_nactive 420 records preceding that record are checked.

In an example, after a journal record is identified that is estimated to have a high enough sequence value, a binary search can be performed to determine whether this journal record depends from any null journal records. Once an otherwise valid journal record is determined to be dependent upon a null journal record, one or more embodiments can determine whether all of the journal records at issue should be invalidated (e.g., the journal is blown), or not.

In one or more embodiments, this broad determination of whether to discontinue use of the journal records can be made based on a number of journal records between the estimated highest sequence journal record and the null journal record, also termed a null distance value herein. In some implementations, a threshold number is set based on an estimated number of 'inflight' writes that are occurring in the journal at a selected time. When the null distance exceeds this threshold, it can be presumed that the null records were not normally caused only by the interruption of inflight writes, rather a different problem has occurred.

Alternatively, when the null distance does not exceed the threshold, one or more embodiments cause the system to invalidate a smaller portion of the journal records, e.g., the previously estimated highest sequence journal record, and any records of a lower sequence number between this journal record and another candidate highest sequence journal record. One or more embodiments can identify the new candidate highest sequence journal record from records earlier in the sequence than the identified null record so as to prevent the new record from depending upon the identified null record.

It is noted that, a binary search of a selected range of journal records can be used to locate null/invalid journal records, and that these records may or may not have sequential jlr_seq 430 numbers. In one or more embodiments, different approaches described herein can limit the range of records that are analyzed to a selected level of accuracy, e.g., to reduce the amount of searching required.

FIGS. 5A-5B depict diagrams 500 and 501 respectively that illustrate a non-limiting example of how one or more embodiments can facilitate identifying a current journal state by determining the most recent valid journal record using valid and null journal records, in accordance with one or more embodiments. For purposes of brevity, description of like elements and/or processes employed in other embodiments is omitted. As depicted, system 500 includes a journal records range of sequence numbers 590 ascending to the right, with a series of examples 520A-E that illustrate different elements of one or more embodiments described herein. Examples 520A-E have example ranges of journal records labeled, e.g., a low range of null journal records 550A-E, valid journal records 565A-E, otherwise valid journal records with out of order writes 570A-E, and a high range of journal records with null records 566A-E.

For each of examples 520A-E, points 595 labels the highest sequence number journal record of the valid journal records 565A-E, and point 596 labels the highest sequence number journal record of the otherwise valid journal records with out of order writes 570A-E. As noted above, one or more embodiments can differentiate between the journal record at point 595 and point 596, and select point 595 as the valid journal record written to disk with the highest sequence number 590, e.g., the current journal state, to which new journal records can be linked in sequence. Examples 520A-E illustrate different actions that can be performed by one or more embodiments to determine point 595.

One or more embodiments can perform a binary search on a selected range of records to identify points 595 and 596, as well as the other types of records labeled in examples 520A-E. One characteristic of this approach is that, in some circumstances, the approach could entail a read of every potentially valid record at issue. To avoid the performance disadvantages of this approach, one or more embodiments can use one or more of the assumptions discussed below to limit the range of journal records that are searched to identify point 595. It should be noted that these assumptions need not all be used for the operation of different embodiments, and that some of the assumptions are based on characteristics of implementations, and some are based on enabling actions used during the operation of embodiments.

For example, one or more embodiments can use SSD 162 as a medium to store journal records after they are flushed from journal cache 163. An assumption that results from the use of SSD 162 by some embodiments is that there are no undetected bad blocks, e.g., when a block written to SSD 162 is read without error, the data read results from an earlier write to SSD 162, either at the time of new journal or during later operations. One or more embodiments use this assumption to limit binary search ranges after analyzing the likelihood of undiscovered uncorrectable errors in data written to SSD 162, e.g., some implementations of SSD 162 include built-in error correction which can result in bad blocks clearly returning read errors, not erroneous data.

Another assumption that can be used to facilitate approaches described herein is that the set of null records is mostly contiguous, with a potential a range of records at the start of the null region being intermixed with other kinds of records, e.g., due to out of order writes 570A-E. The start of the null region, if it exists, is immediately adjacent to the current highest record in the valid journal state. One or more embodiments can operate under an assumption that all non-null records in the null region have a sequence higher that that at the end of the valid journal state.

In one or more embodiments, the range of records of examples 520A-E can be termed a superblock and can contain a hint (e.g., hints 564A-E), that lists the position of a non-null record, e.g., for examples 520B-C, respective hints 564A-B can be in the range of valid-journal records 565B-C. In one or more embodiments, hints can be generated during different operations, e.g., when starting a new journal or restoring a journal, embodiments can generate a valid journal of contiguous valid records, with all other records null and can also initialize a valid hint for the superblock of journal records. It is important to note that, one or more embodiments, normal journal writes don't convert a non-null journal record to a null journal record, and thus, these normal journal writes generally do not trigger an update of the hint in the superblock.

In one or more embodiments, when generating or restoring journal records, for journal records after the existing start of the null region can be replaced with null records, and records after the start can be replaced with non-null records with lower sequences. The record nulling updates the superblock hint before nulling any records.

Returning to the example depicted in FIG. 5A, as an initial action for examples 520B-C, respective hints 564A-B can identify a journal record that can provide a starting point for analyzing the ranges of records. As noted above, in one or more embodiments, hint identifying component 122 can identify hint 564A-B. In one or more embodiments, during the operation of journal record operations, one or more embodiments of examples 520B-C can store hints 564A-B as a reference to a valid journal record in accordance with sequence numbers 590, and is not an invalid journal record based on an out of order write 570B-C.

It is understood by one having skill in the relevant art(s) that a 'hint' journal record (or just a hint) can also be termed a cache control instruction, e.g., foreknowledge of a memory access value or pattern that can be embedded in an instruction stream of a processor to improve the performance of a cache. Given the description of the hint record describe herein and the different approaches to analyzing journal records, one having skill in the relevant art(s) understands that some embodiments can provide foreknowledge of a location to start analysis of the journal records, e.g., to improve performance in some circumstances by advantageously limiting the range of journal records that are analyzed.

Continuing the description of examples 520B-C, when a second non-null record is identified, and the next two records read after the starter record are both "null," the circular buffer can be partitioned into two regions. That is, in one or more embodiments, the starter record either has a greater sequence number than the current most recent journal record, or the starter record is in the same region as that record. In either case, the region having the starter record has a record with a sequence greater than or equal to the current most recent record, so, to reduce overhead, one or more embodiments can restrict the search to that region, then continue bisecting and restricting the region until a non-null record is found.

In embodiments of this process, once the hint record and two non-null records are identified, the required search range can be restricted to that part of the circular buffer which lies 1) after the journal record with the higher sequence, but 2) before the one with the lower sequence. In some embodiments, any null record in this region can, in some circumstances, be guaranteed to lie past the most recent journal record, and this can provide binary search criteria for a standard binary search to locate the most recently stored, valid journal record in the restricted range.

As depicted, in examples 520B-C, once two records with known sequence numbers are identified, the sequence can determined to be greater than the highest record in a valid journal (e.g., point 595). Example 520D depicts an alternate result after the first pass (analysis of the hint record), that can be determined once two records with known sequence numbers are identified. In this example, the journal record with the highest sequence number lies past the higher of the two sequences but before the lower of the two sequences. In this example, any null record in that region also lies past the highest record in a valid journal, and so may be handled by a normal binary search algorithm. It should be noted that, in this example 520D, of the two records bounding the current range, the end-of-journal lies after the one with the higher sequence number, but before the one with the lower sequence number, which can lead to an inversion of the usual binary search comparison in some circumstances.

FIG. 5B depicts example 520E, where once hint record 564D and two records with known sequence numbers (non-null records) are identified, it can be determined that the hint record has a sequence greater than the sequence of the highest record in a valid journal. Based on this limitation of the required search range, as with examples discussed above, a binary search for a valid journal records can be beneficially limited to the region containing the hint record.

Figure 6:
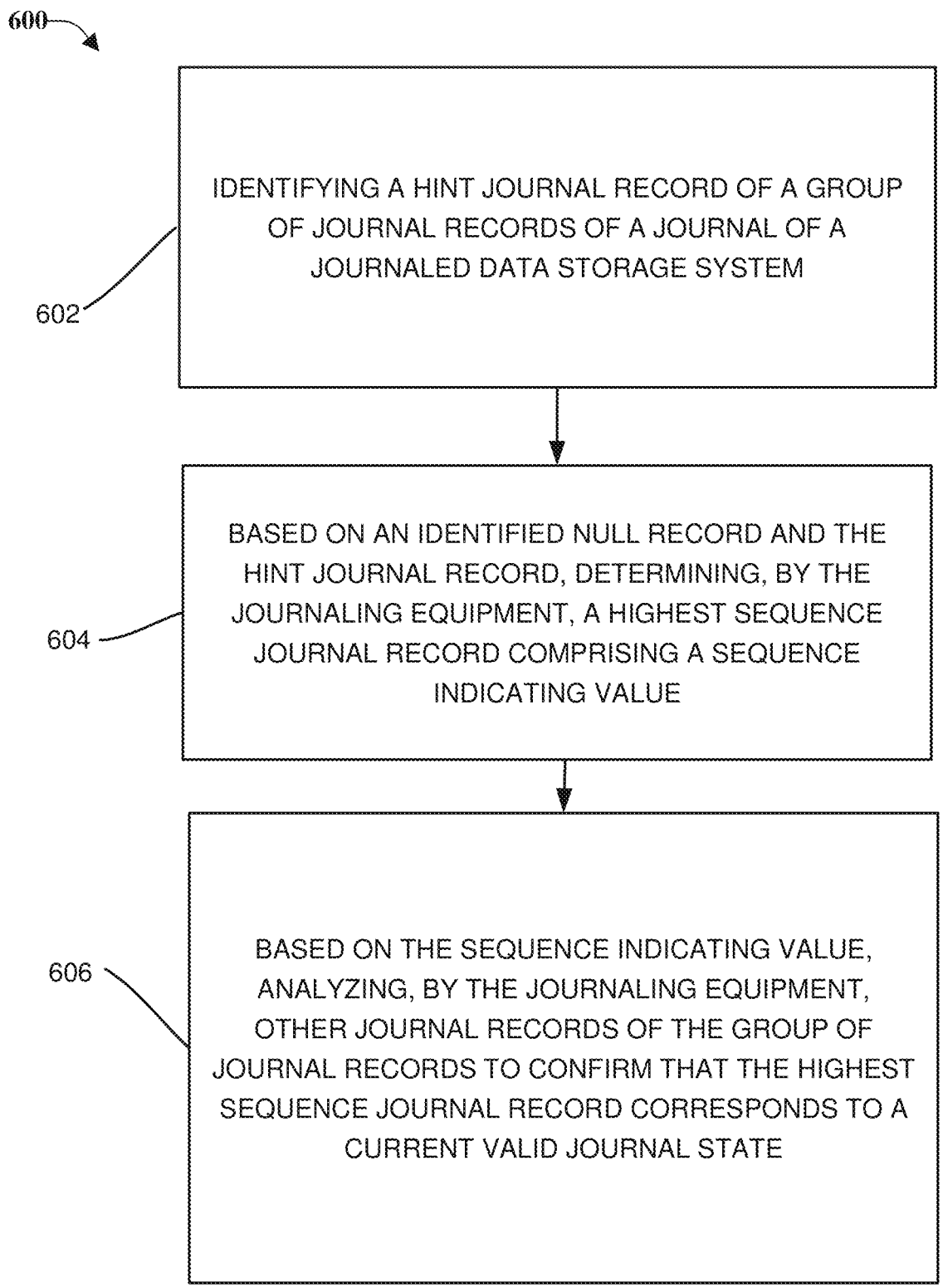
FIG. 6 depicts a flow diagram representing example operations of a non-limiting example method that can facilitate identifying a current journal state by determining the most recent valid journal record using valid and null journal records, in accordance with one or more embodiments.

FIG. 6 depicts a flow diagram representing example operations of a non-limiting example method 600 that can facilitate identifying a current journal state by determining the most recent valid journal record using valid and null journal records, in accordance with one or more embodiments. For purposes of brevity, description of like elements and/or processes employed in other embodiments is omitted.

In some examples, one or more embodiments of method 600 can be implemented by hint identifying component 122, sequence identifying component 124, dependence confirming component 126, and other components that can be used to implement parts of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602, method 600 can comprise identifying a hint journal record of a group of journal records of a journal of a journaled data storage system. At 604, method 600 can further comprise, based on an identified null record and the hint journal record, determining, by the journaling equipment, a highest sequence journal record comprising a sequence indicator. Further, at 606, method 600 can comprise, based on the sequence indicator, analyze other journal records of the group of journal records to confirm that the highest sequence journal record corresponds to a valid journal state.

Figure 7:
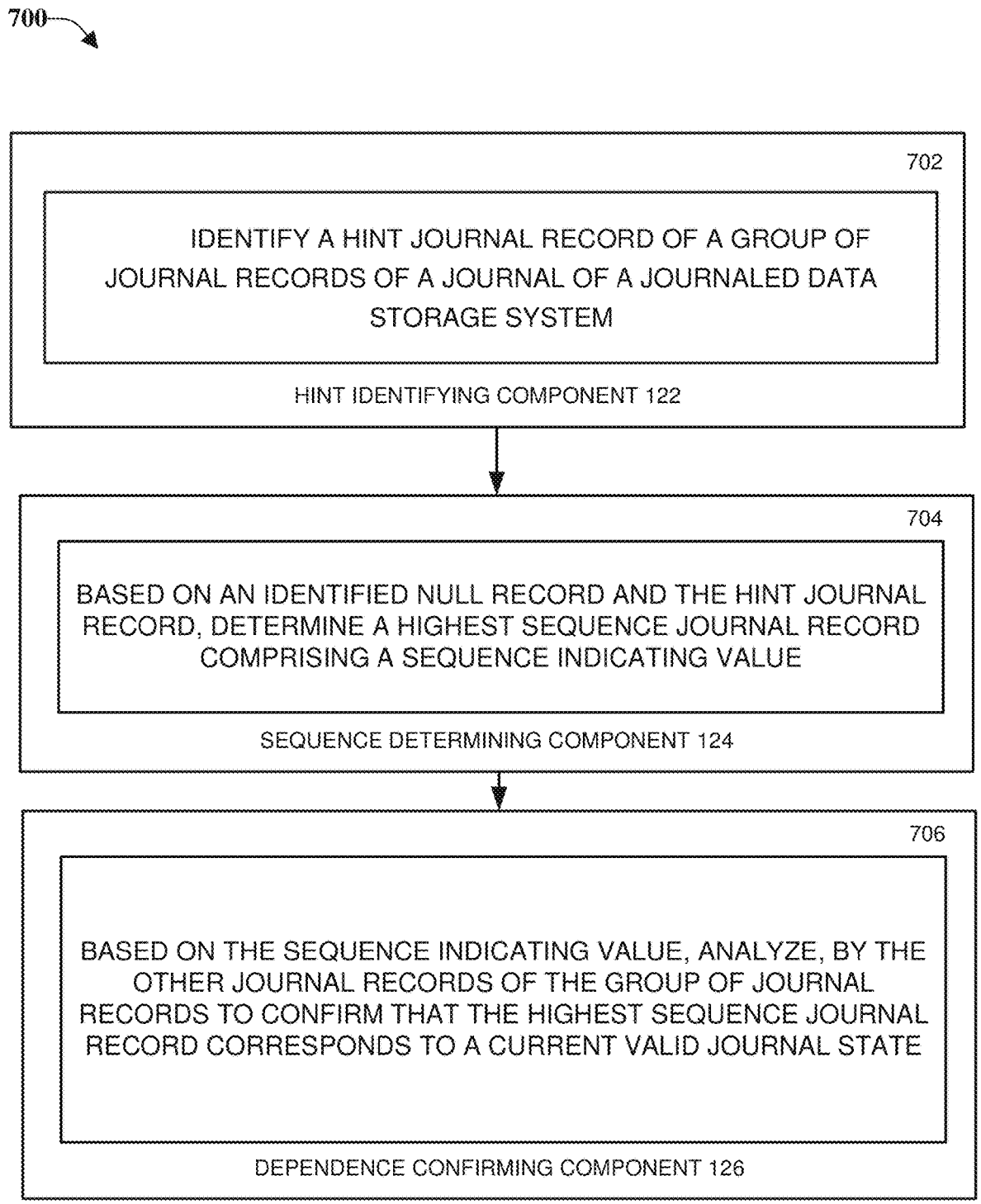
FIG. 7 depicts a non-limiting example system that can facilitate identifying a current journal state by determining the most recent valid journal record using valid and null journal records, in accordance with one or more embodiments.

FIG. 7 depicts a non-limiting example system 700 that can facilitate the performance of operations of one or more embodiments described herein. For purposes of brevity, description of like elements and/or processes employed in other embodiments is omitted. Example system 700 can include hint identifying component 122, sequence identifying component 124, dependence confirming component 126, and other components that can be used to implement different embodiments of system 700, as described herein, in accordance with one or more embodiments.

At 702 of FIG. 7, hint identifying component 122 can identify a hint journal record of a group of journal records of a journal of a journaled data storage system. At 704 of FIG. 7, sequence identifying component 124 can based on an identified null record and the hint journal record, determine, by the journaling equipment, a highest sequence journal record comprising a sequence indicator. At 706 of FIG. 7, dependence confirming component 126 can based on the sequence indicator, analyze, by the journaling equipment, other journal records of the group of journal records to confirm that the highest sequence journal record corresponds to a valid journal state.

Figure 8:
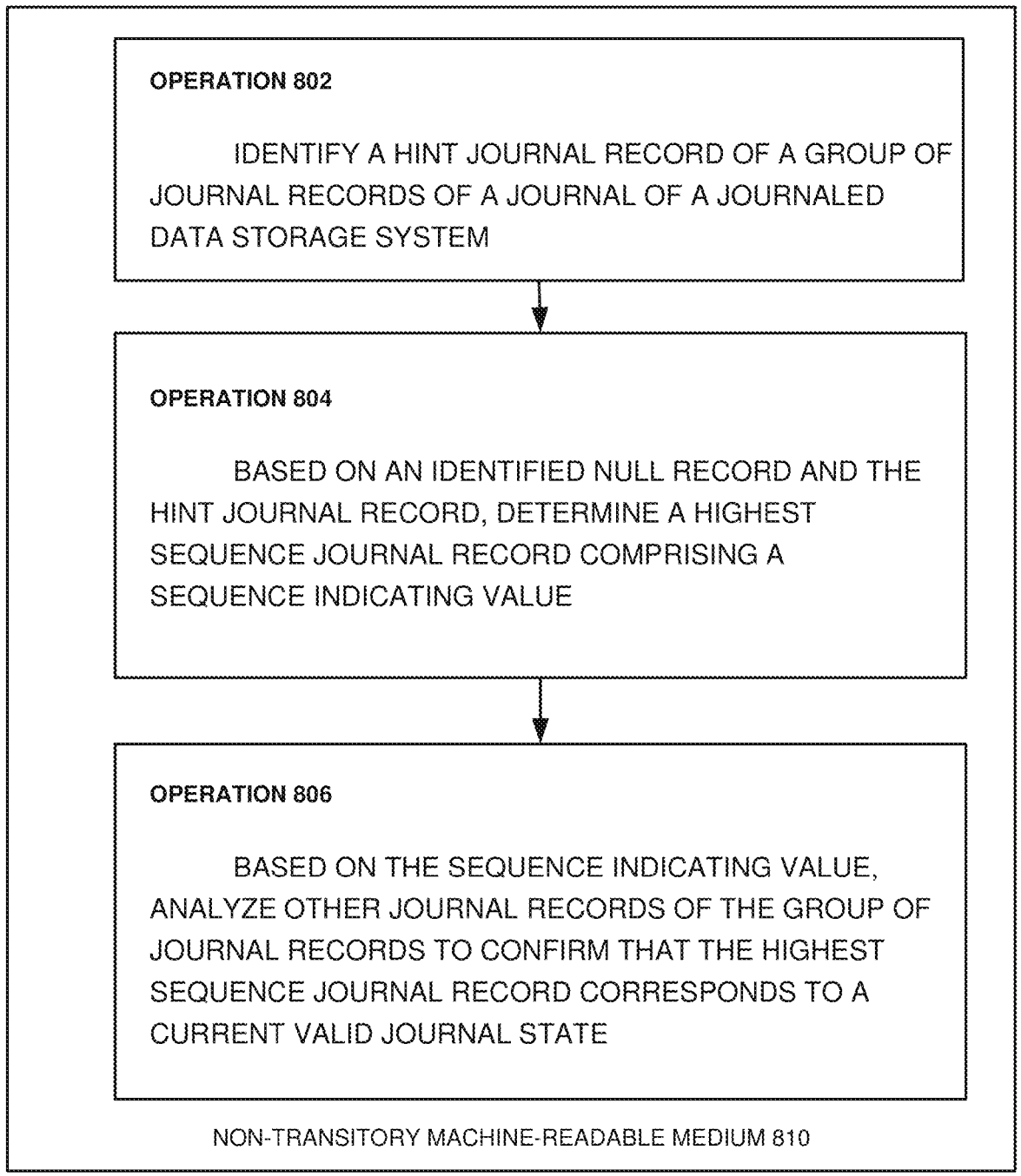
FIG. 8 depicts a non-limiting example non-transitory machine-readable medium 800 that can include executable instructions that, when executed by a processor of a system, facilitate identifying a current journal state by determining the most recent valid journal record using valid and null journal records, in accordance with one or more embodiments.

FIG. 8 depicts a non-limiting example non-transitory machine-readable medium 800 that can include executable instructions that, when executed by a processor of a system, facilitate identifying a current journal state by determining the most recent valid journal record using valid and null journal records, in accordance with one or more embodiments. For purposes of brevity, description of like elements and/or processes employed in other embodiments is omitted.

Operation 802 of FIG. 8 can facilitate generation of hint identifying component 122, which, in one or more embodiments, can identify a hint journal record of a group of journal records of a journal of a journaled data storage system. Operation 804 of FIG. 8 can facilitate generation of sequence identifying component 124 which, in one or more embodiments can, based on an identified null record and the hint journal record, determine, by the journaling equipment, a highest sequence journal record comprising a sequence indicating value. Operation 806 of FIG. 8 can facilitate generation of dependence confirming component 126 which, in one or more embodiments can, based on the sequence indicating value, analyze, by the journaling equipment, other journal records of the group of journal records to confirm that the highest sequence journal record corresponds to a current valid journal state.

Figure 9:
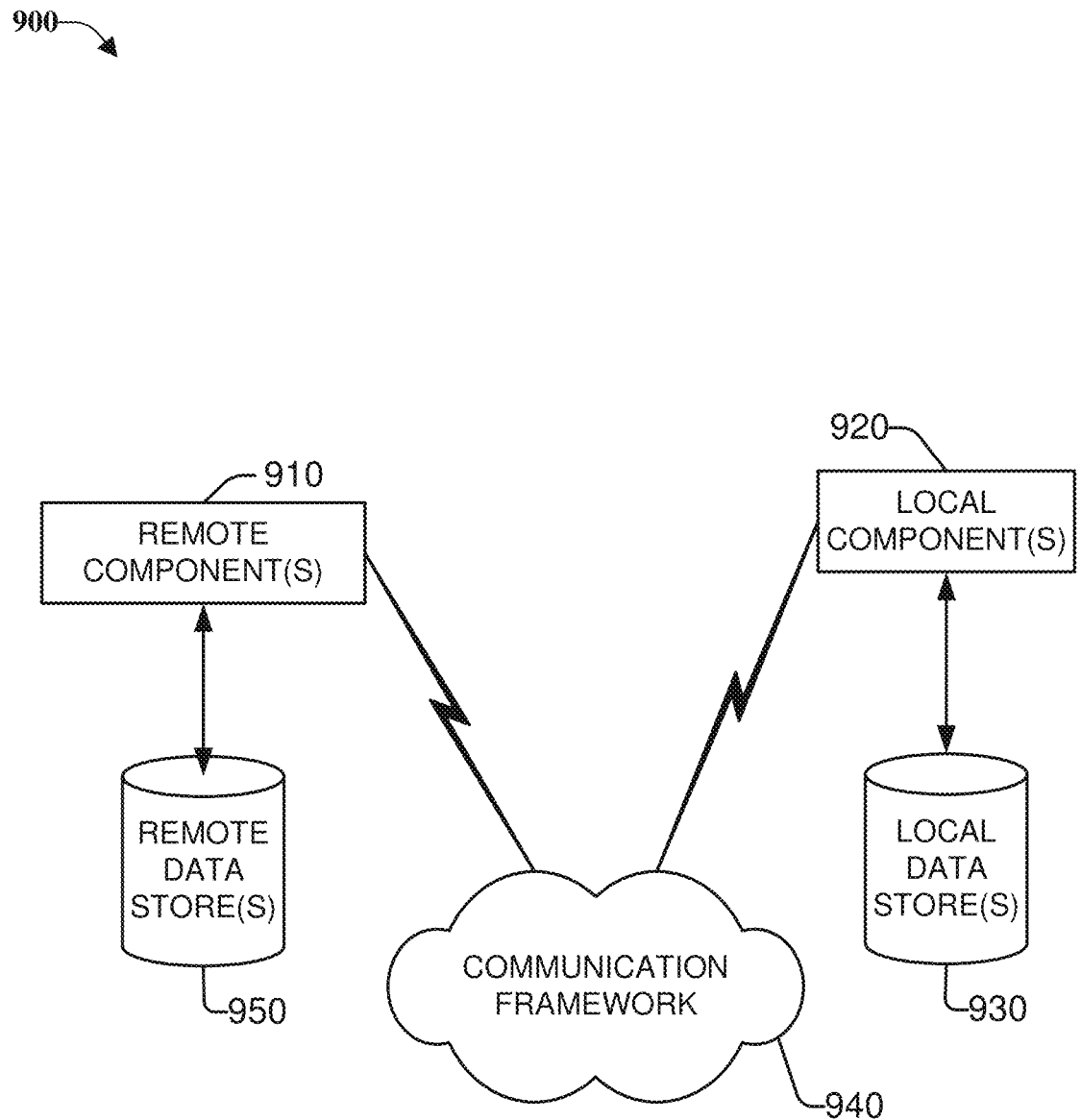
FIG. 9 depicts a non-limiting example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various elements of the disclosed subject matter, the following discussion is intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. One or more embodiments described and suggested herein can also be practiced in distributed computing environments where tasks are performed by remote processing devices that are linked through a communications network; however, some if not all parts of the subject disclosure can be practiced on stand-alone computers. In a distributed computing environment, program modules can be located in both local and remote memory storage devices.

Figure 10:
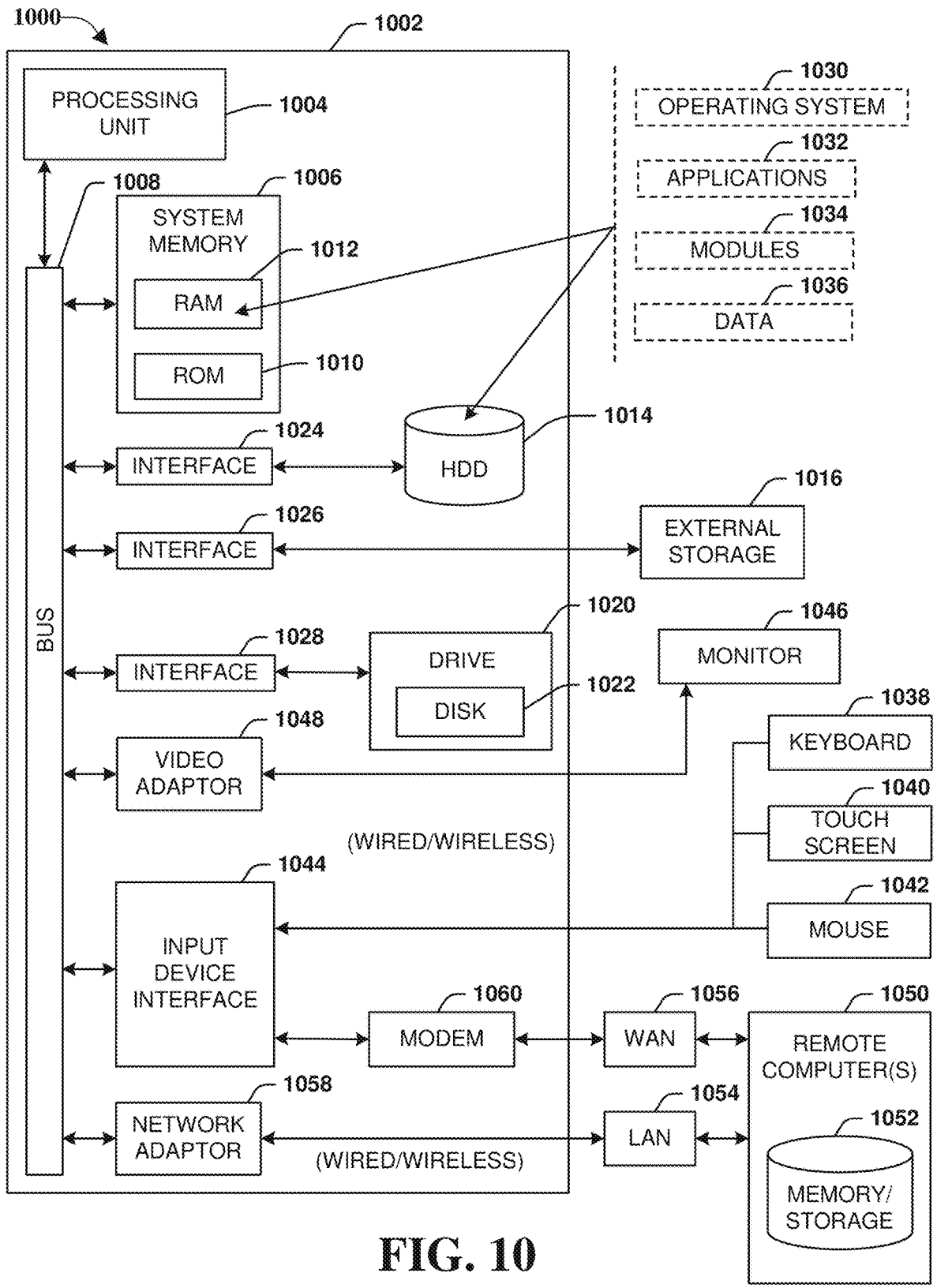
FIG. 10 illustrates a non-limiting example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Features, approaches, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   identifying, by journaling equipment comprising a processor, a hint journal record of a group of journal records of a journal of a journaled data storage system;
   based on a null journal record and the hint journal record, determining, by the journaling equipment, a highest sequence journal record comprising a sequence indicator;
   based on the sequence indicator, analyzing, by the journaling equipment, other journal records of the group of journal records to confirm that the highest sequence journal record corresponds to a valid journal state that has been identified in response to determining that the highest sequence journal record is valid and determining that the null journal record of the group of journal records depends from the highest sequence journal, wherein a number of journal records between the highest sequence journal record and the null journal record represents a null distance value; and
   based on determining the null distance value between the highest sequence journal record and the null journal record and confirming that the highest sequence journal record corresponds to the valid journal state, reducing, by the journaling equipment, caching operations performed by an operating system operational on the journaling equipment.

2. The method of claim 1, wherein identifying the highest sequence journal record comprises:
   validating, by the journaling equipment, the highest sequence journal record; and
   estimating, by the journaling equipment, that the highest sequence journal record comprises a highest sequence indicator of the group of journal records.

3. The method of claim 2, wherein the valid journal state is identified based on:
the highest sequence journal record being valid; and
based on the other journal records, determining, by the journaling equipment, that the highest sequence journal record comprises a highest identified sequence number of the group of journal records.

4. The method of claim 3, wherein the highest sequence journal record depends from the other journal records, wherein analyzing the other journal records comprises validating the other journal records, and wherein the valid journal state is identified further based on a determination that the other journal records do not comprise any null journal records.

5. The method of claim 4, wherein analyzing the other journal records employs a binary search of the group of journal records.

6. The method of claim 2, wherein validating the highest sequence journal record comprises applying a checksum value to the highest sequence journal record.

7. The method of claim 2, wherein validating the highest sequence journal record comprises interpreting a file type identifier of the highest sequence journal record.

8. The method of claim 1, wherein the hint journal record comprises a starter journal record that is valid and comprises a hint sequence indicator.

9. The method of claim 1, wherein identifying the highest sequence journal record comprises, analyzing the other journal records, identifying that the hint journal record corresponds to the highest sequence journal record.

10. The method of claim 1, wherein the valid journal state comprises a contiguous block of valid journal records.

11. The method of claim 1, further comprising, mounting, by the journaling equipment, the journal for journaling based on the valid journal state.

12. The method of claim 1, wherein
based on the highest sequence journal record depending from the null journal record, invalidating, by the journaling equipment, the highest sequence journal record, rendering the highest sequence journal record an additional null journal record; and
based on journal records of the group of journal records with lower sequence values than the null journal record, estimating, by the journaling equipment, that a new valid highest sequence journal record comprises the highest sequence indicator of the group of journal records.

13. The method of claim 12, further comprising, before estimating that the new valid highest sequence journal record comprises the highest sequence indicator, based on the null distance value, invalidating, by the journaling equipment, the group of journal records for use in determining the valid journal state.

14. The method of claim 13, wherein invalidating the group of journal records is based on the null distance value being determined to be above a defined threshold amount of journal records.

15. The method of claim 12, further comprising, before estimating that the new valid highest sequence journal record comprises the highest sequence indicator, determining, by the journaling equipment, that the null distance value is above a defined threshold amount of journal records.

16. Transaction equipment, comprising:
at least one memory that stores computer executable components; and
at least one processor that executes the computer executable components stored in the at least one memory, wherein the computer executable components comprise:
a journal state receiving component that receives, from journaling equipment, an indication comprising an identified journal record of a group of journal records of a journal of a journaled data storage system, wherein the identified journal record corresponds to a current valid journal state of the journal,
a transaction component that, based on the identified journal record, maintains a dependence from new journal records of the journal and the identified journal record, wherein the journaling equipment identified the current valid journal state based on a null distance value representative of a number of journal records between a most recently generated journal record of the group of records and a null journal record of the group of journal records and identifying a valid journal record of the group of journal records that corresponded to the most recently generated journal record of the group of journal records that did not depend from the null journal record of the group of journal records; and
an operating system in execution on the transaction equipment, wherein, based on determining the null distance value and identifying the valid journal record, the operating system reduces a number of caching operations being performed.

17. The transaction component of claim 16, wherein the journaling equipment identified the current valid journal state by employing a binary search based on a valid hint journal record of the group of journal records.

18. A non-transitory machine-readable medium comprising executable instructions that, when executed by at least one processor of a first computing device, facilitate performance of operations, the operations comprising:
identifying a hint journal record of a group of journal records of a journal of a journaled data storage system;
based the hint journal record, identifying a most recently generated valid journal record of the group of journal records that does not depend from a null journal record of the group of journal records;
identifying the most recently generated valid journal record as a current valid journal state of the journal, wherein the current valid journal state of the journal is determined based on a null distance value representing a number of journal records between the most recently generated valid journal record of the group of journal records and the null journal record of the group of journal records; and
based on determining the null distance value and determining the current valid journal state of the journal, reducing a number of caching operations being performed by an operating system executing on the first computing device.

19. The non-transitory machine-readable medium of claim 18, wherein the operations further comprise mounting the journal for journaling based on the current valid journal state.

20. The non-transitory machine-readable medium of claim 18, wherein identifying the most recently generated valid journal record employs a binary search of the group of journal records based on the hint journal record.

* * * * *